US008974221B2

(12) United States Patent
Suenami

(10) Patent No.: US 8,974,221 B2
(45) Date of Patent: Mar. 10, 2015

(54) MOLDING MACHINES AND METHODS OF MOLDING RESIN PRODUCTS

(75) Inventor: Kensuke Suenami, Toyota (JP)

(73) Assignee: Kojima Press Industry Co., Ltd., Toyota-Shi, Aichi-Ken (JP)

( * ) Notice: Subject to any disclaimer, the term of this patent is extended or adjusted under 35 U.S.C. 154(b) by 217 days.

(21) Appl. No.: 13/360,705

(22) Filed: Jan. 28, 2012

(65) Prior Publication Data

US 2012/0193834 A1   Aug. 2, 2012

(30) Foreign Application Priority Data

Feb. 1, 2011   (JP) ................................ 2011-019657

(51) Int. Cl.
*B29C 45/20* (2006.01)
*B29C 45/23* (2006.01)
*B29C 45/03* (2006.01)
*B29C 45/14* (2006.01)

(52) U.S. Cl.
CPC ........... *B29C 45/03* (2013.01); *B29C 45/14344* (2013.01)
USPC ........................................ 425/563; 264/328.1

(58) Field of Classification Search
USPC ......... 425/469, 557, 572, 562, 563, 564, 568, 425/561
See application file for complete search history.

(56) References Cited

U.S. PATENT DOCUMENTS

| 286,605 | A | * | 10/1883 | Grant | 604/194 |
|---|---|---|---|---|---|
| 2,304,461 | A | * | 12/1942 | Knowles | 425/123 |
| 2,487,703 | A | * | 11/1949 | Gougler | 425/138 |
| 2,561,021 | A | * | 7/1951 | Groth | 425/550 |
| 2,577,412 | A | * | 12/1951 | Wesley | 425/591 |
| 2,592,296 | A | * | 4/1952 | Kutik | 264/318 |
| 2,676,357 | A | * | 4/1954 | Shannon | 425/550 |
| 2,783,490 | A | * | 3/1957 | Kutik | 15/187 |
| 2,821,764 | A | * | 2/1958 | Leahy et al. | 24/713.6 |
| 3,052,925 | A | * | 9/1962 | Bronnenkant et al. | 264/328.17 |
| 3,176,057 | A | * | 3/1965 | Peters et al. | 264/266 |
| 3,278,992 | A | * | 10/1966 | Strauss | 425/136 |
| 3,395,424 | A | * | 8/1968 | Nouel | 222/380 |
| 3,495,302 | A | * | 2/1970 | Green et al. | 425/170 |
| 3,756,782 | A | * | 9/1973 | Phillips | 436/11 |
| 3,871,805 | A | * | 3/1975 | Jacobs | 425/550 |
| 3,941,540 | A | * | 3/1976 | Driscoll et al. | 425/548 |
| 3,954,209 | A | * | 5/1976 | Ramond | 222/496 |
| 4,681,528 | A | * | 7/1987 | Maruyama et al. | 425/562 |
| 5,049,062 | A | * | 9/1991 | Gellert | 425/549 |
| 5,059,113 | A | * | 10/1991 | Ito et al. | 425/564 |

(Continued)

FOREIGN PATENT DOCUMENTS

| JP | 58-164726 U | 11/1983 |
|---|---|---|
| JP | 10-024420 A | 1/1998 |

(Continued)

OTHER PUBLICATIONS

Notice of Reasons for Rejection dated Jul. 1, 2014 for Japanese Patent Application No. 2011-019657 (5 pages).

*Primary Examiner* — Matthew Daniels
(74) *Attorney, Agent, or Firm* — Conley Rose, P.C.

(57) ABSTRACT

In one aspect of the present teachings, a molding machine includes an injection device and a mold. The injection device can inject molten resin. The mold is directly supported by the injection device and defines a cavity for receiving the molten resin injected by the injection device.

12 Claims, 5 Drawing Sheets

(56) References Cited

U.S. PATENT DOCUMENTS

| | | | |
|---|---|---|---|
| 5,098,280 A * | 3/1992 | Trakas | 425/549 |
| 5,380,188 A * | 1/1995 | Ullisperger | 425/563 |
| 5,545,023 A * | 8/1996 | Hosokawa et al. | 425/171 |
| 7,396,222 B2 | 7/2008 | Saito | |
| 2002/0028270 A1 | 3/2002 | Gustafsson et al. | |
| 2004/0101586 A1 | 5/2004 | Kamiya et al. | |
| 2005/0175732 A1 * | 8/2005 | Saito et al. | 425/569 |
| 2007/0292557 A1 * | 12/2007 | Dewar et al. | 425/564 |

FOREIGN PATENT DOCUMENTS

| | | |
|---|---|---|
| JP | 2001-503344 A | 3/2001 |
| JP | 2002-355848 A | 12/2002 |
| JP | 2004-268456 A | 9/2004 |
| JP | 2008284759 | 5/2007 |
| JP | 2011-016294 A | 1/2011 |

* cited by examiner

MOLDING MACHINES AND METHODS OF MOLDING RESIN PRODUCTS

CROSS-REFERENCES TO RELATED APPLICATIONS

This application claims priority to Japanese Patent Application Serial Number 2011-19657, the contents of which are incorporated herein by reference.

BACKGROUND OF THE INVENTION

1. Field of the Invention

The present invention relates to molding machines used for injection-molding resin products. The present invention also relates to methods of molding resin products.

2. Description of the Related Art

A molding machine for directly molding a resin product on a base member is known. In a known direct molding process, a mold is brought to contact with a previously molded base member to define a cavity between a surface of the base produce and the mold, and a molten resin is then injected into the cavity, so that a resin product, such as a rivet, a clip and a rib, may be fixed to the base member during the injection molding process. By using the direct molding process, it is possible to mold a resin product having an intended shape at a desired position of the base member without need of change of design of a mold that is used for molding the base member. In addition, a joint member for joining two separate base members can be molded by the direct molding process, so that it is possible to join the base members at a lower cost because a management cost for a separate joint member is not necessary. As a material of the resin product, polypropylene resin having a melting point of about 220 degrees has been generally used.

In order to perform a direct molding process, there has been known a technique of using a vertical injection molding machine as disclosed in Japanese Laid-Open Patent Publication No. 2008-284759.

Unlike a generally known injection molding process, in which a resin product is molded as an individual product, a position of a part of a base member where a resin product is molded is important in the case of application of the direct molding process. Thus, it is preferable that the position of a part of the base member where the resin product is molded can be easily changed. However, with the direct molding machine incorporating the technique of a generally known injection molding machine, it requires troublesome operations for changing the molding position. FIG. 5 shows a part of a direct molding machine 9 that utilizes a vertical injection molding machine. As shown in FIG. 5, an injection-side mold 91 is directly fixed to a mount surface 921 of a mount base 92. Due to this arrangement, an injection device 93 for injecting a molten resin is necessary to be mounted to the mount base 92 from the side of a surface 922 opposite to the mount surface 921. For this reason, a hole 923 sized for receiving an injection nozzle 931 of the injection device 93 must be formed previously in the mount base 92 at a position corresponding to a desired molding position.

If it is desired to change the molding position in the direct molding machine shown in FIG. 5, the following troublesome operations are necessary to be performed. Thus, in order to change the molding position, the mold 91 and the injection device 93 are removed individually from the mount base 92. Then, the mount base 92 is removed from tie bars 94 and is replaced with another mount base having a hole for receiving the injection nozzle 931 at a different position from that of the mount base 92. Thereafter, the mold 91 and the injection device 93 are mounted to the replaced mount base.

Therefore, there has been a need in the art to enable easy change of a molding position.

SUMMARY OF THE INVENTION

In one aspect of the present teachings, a molding machine includes an injection device and a mold. The injection device can inject molten resin. The mold is directly supported by the injection device and defines a cavity for receiving the molten resin injected by the injection device.

DETAILED DESCRIPTION OF THE INVENTION

Figure 1:
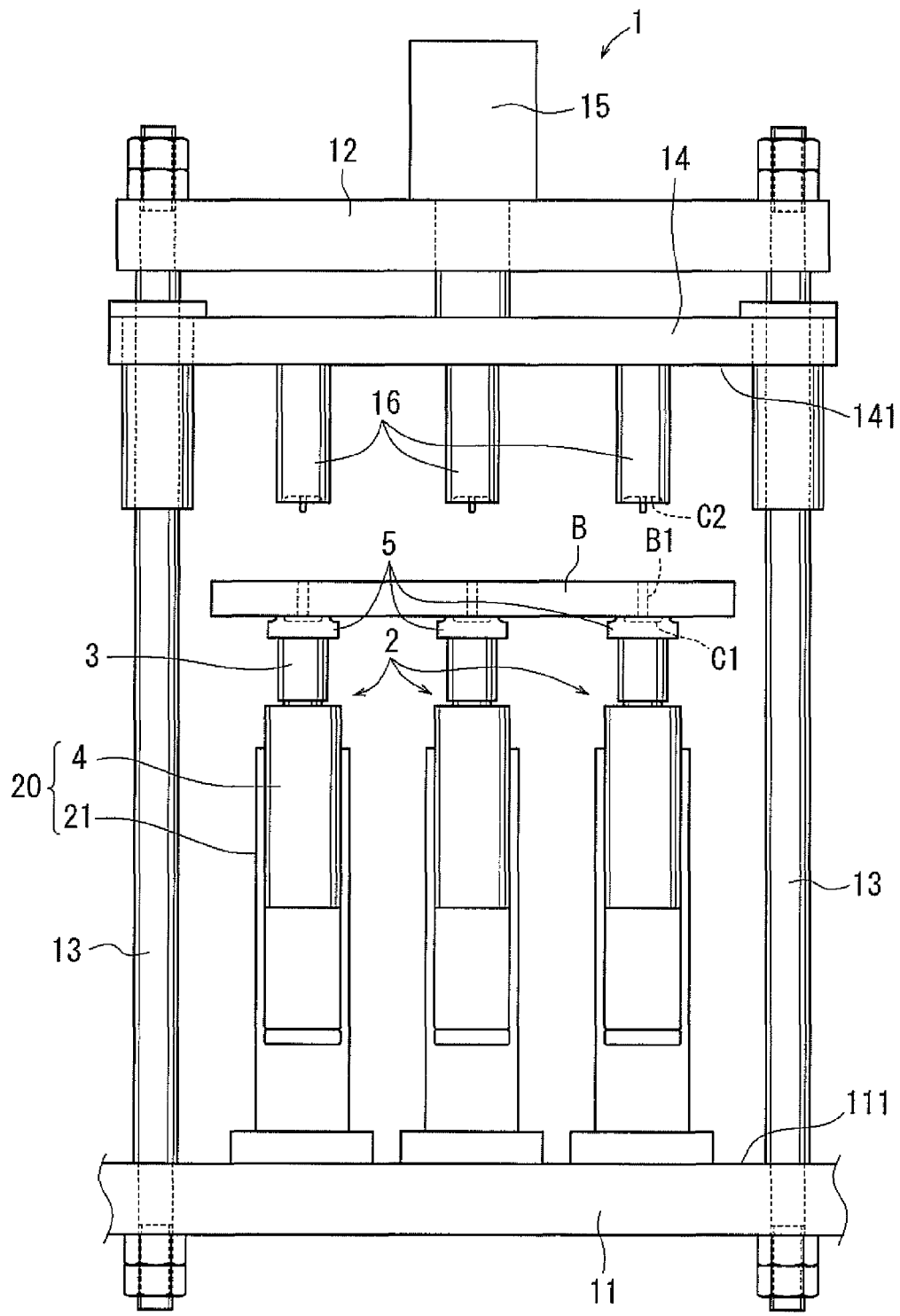
FIG. 1 is a front view of a molding machine according to an example.

Each of the additional features and teachings disclosed above and below may be utilized separately or in conjunction with other features and teachings to provide improved molding machines and molding methods. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a molding machine includes a first mold, an injection device, and a first mount base having a mount surface. The injection device is mounted to the mount surface of the first mount base. The first mold is mounted to the injection device. The first mold is configured to define at least a part of a cavity when the first mold contacts a previously molded base member. The injection device is configured to inject a molten resin into the cavity, so that a resin product molded by the resin injected into the cavity is fixed to the base member.

With this arrangement, the first mold on the injection side is directly connected to the injection device without intervention of any member. Therefore, moving the injection device together with the first mold can easily change the molding position.

The molding machine may further include a second mount base having a mount surface positioned to be opposed to the mount surface of the first mount base, a second mold and a mold clamping device. The mold clamping device is configured to move at least one of the first mold and the second mold, so that the first mold and the second mold can move toward each other for contacting with the base member. The cavity may be defined by the first mold, opposite surfaces of the base member and the second mold.

With this arrangement, the cavity can be formed by moving the at least one of the first mold and the second mold, and therefore, it is possible to efficiently perform a direct molding process.

The injection device may include a device body and a tubular injection nozzle. The device body may be mounted to the mount surface of the first mount base. The injection nozzle may be configured to inject the molten resin into the cavity. The first mold may be threadably engaged with a front end of the injection nozzle. The device body may support a base end portion opposite to the front end of the injection nozzle so that the injection nozzle can rotate relative to the device body about an axis of the injection nozzle.

With this arrangement, it is possible to adjust the orientation of the first mold by rotating the injection nozzle even in the event that the first mold has not been oriented to a desired direction as a result of tightening of thread engagement between the first mold and the injection nozzle.

Figure 2:
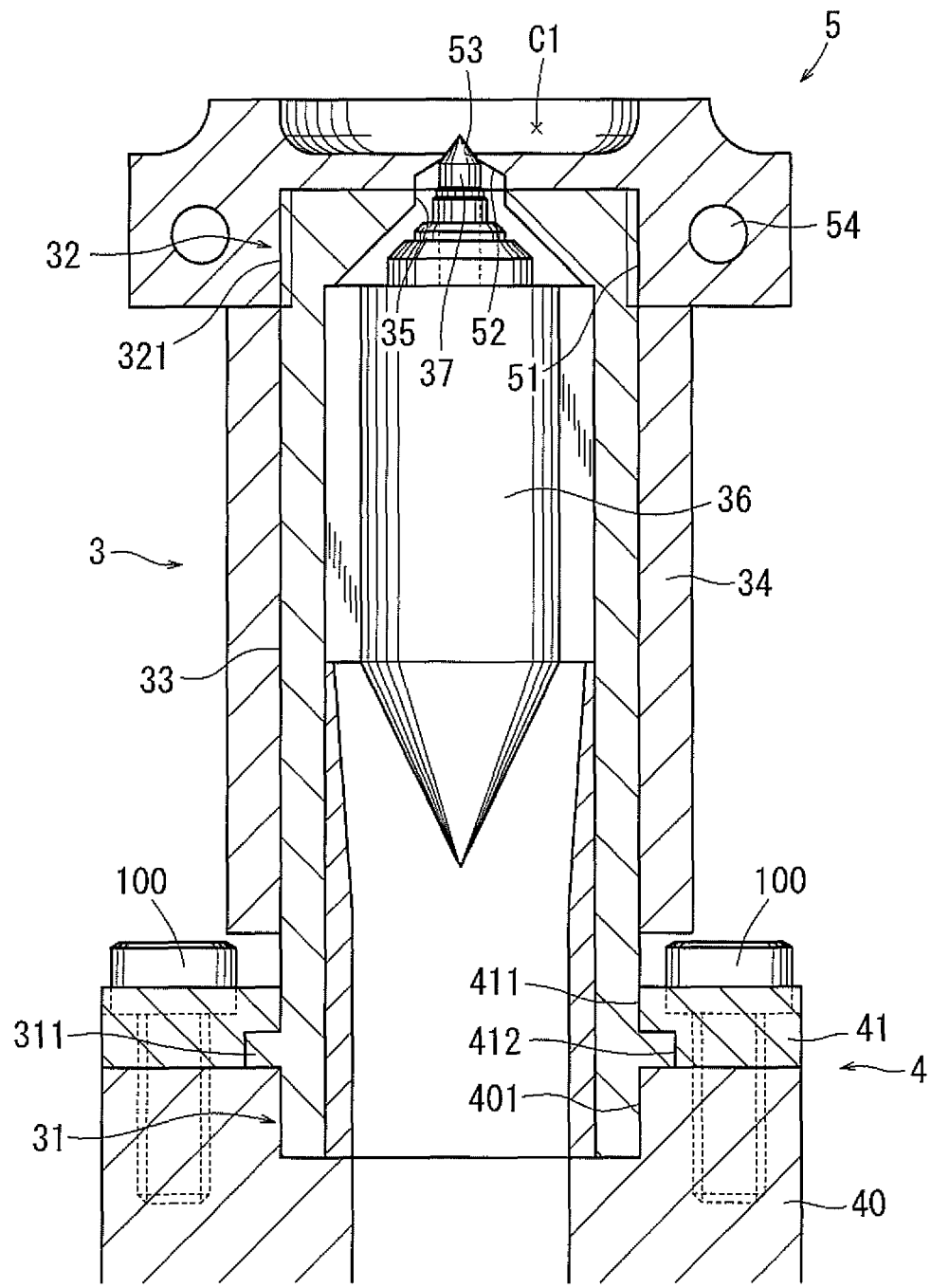
FIG. 2 is a vertical sectional view of one of injection nozzles and its related lower mold of the molding machine.
Figure 3:
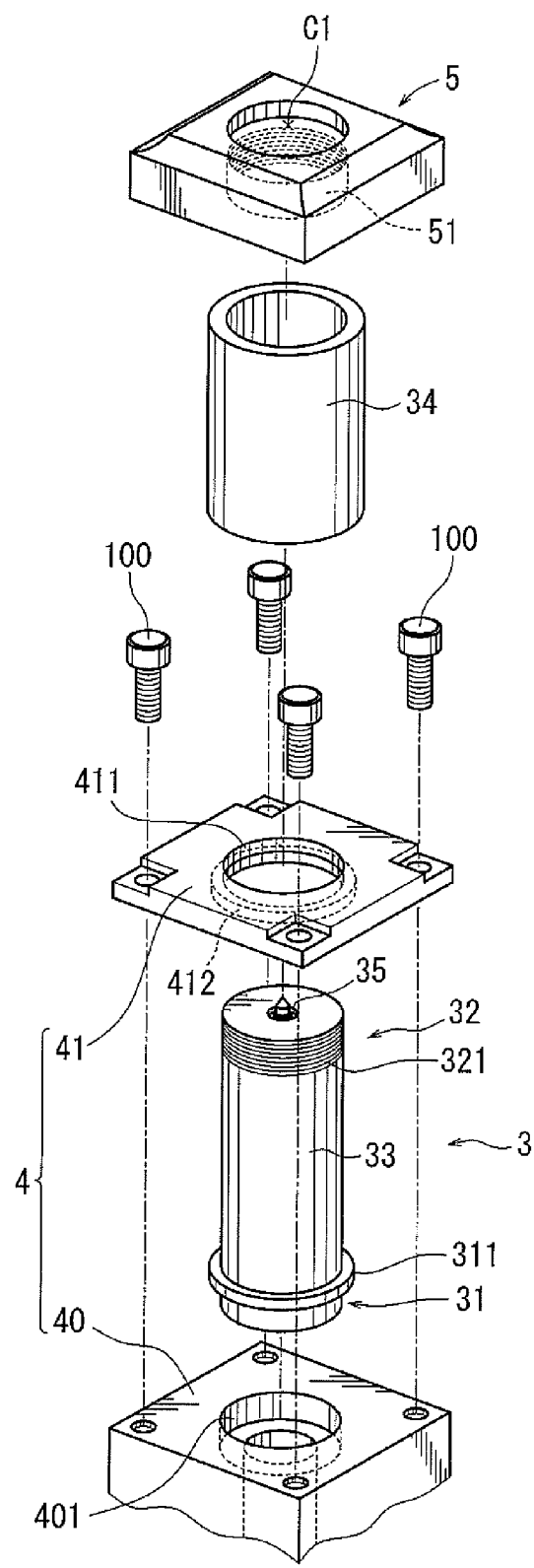
FIG. 3 is an exploded perspective view of one of the injection nozzles and its related lower mold of the molding machine.

A representative example will now be described with reference to FIGS. 1 to 3. Referring to FIG. 1, there is shown a front view of a molding machine 1 configured as a direct molding machine. As shown in FIG. 1, the molding machine 1 includes a fixed-side mount base 11 and a top plate 12 positioned on the lower side and the upper side, respectively. Each of the fixed-side mount base 11 and the top plate 12 has four corners, where the mount base 11 and the top plate 12 are connected to each other by four vertical tie bars 13. The molding machine 1 further includes a movable-side mount base 14 having four corners through which the tie bars 13 extend. The fixed-side mount base 11 and the movable-side mount base 14 have a mount surface 111 and a mount surface 141, respectively, which are opposed to each other in the vertical direction. A plurality of upper molds 5 are mounted to the mount surface 111. A plurality of lower molds 16 are mounted to the mount surface 141. The movable-side mount base 14 is connected to a mold clamping device 15 disposed on the upper side of the movable-side mount base 14. In this example, the mold clamping device 15 is a hydraulic cylinder mounted to the top plate 12 and is operable to move the movable-side mount base 14 upward and downward along the tie bars 13.

As shown in FIG. 1, three pairs of the upper mold 16 and the lower mold 5 are provided and are positioned so as to correspond to three different portions of a base member B, where resin products are molded as will be described later. In this example, the base member B has a plate shape. The upper molds 16 are directly fixedly mounted to the mount surface 141 of the movable-side mount base 14. Three injection devices 2 are fixedly mounted to the mount surface 111 of the fixed-side mount base 14 at positions vertically opposed to the upper molds 16, respectively. Each of the injection device 2 serves to plasticize a resin material into a molten resin and to inject the molten resin into a cavity that may be formed by one of the pairs of the upper and lower molds 16 and 5 as will be explained later. Although not shown in the drawings, a number of bolt insertion holes may be formed in each of the movable-side mount base 14 and the fixed-side mount base 11 in order to enable the upper molds 16 and the injection devices 2 to be mounted at any of different mounting positions.

Each of the injection devices 2 includes a device body 20 and a tubular nozzle 3. The device body 20 is directly mounted to the mount surface 111. The tubular nozzle 3 serves to inject the molten resin and has a front end (upper end as viewed in FIG. 1) to which the lower mold 5 is mounted by way of thread engagement as will be explained later. Therefore, unlike the upper molds 16, the lower molds 5 are not directly mounted to the mount surface 111 of the fixed-side mount base 11 but are indirectly mounted to the mount surface 111 via the injection devices 2. The device body 20 has an injection cylinder 4 and a material supply section 21. The material supply section 21 can receive a supply of a resin material in forms of pellets and serves to feed the pellets into the injection cylinder 4. The injection cylinder 4 serves to force the pellets to move into the injection nozzle 3.

The injection devices 2 and the lower molds 5 will be further described. The injection devices 2 have a same construction. Also, the lower molds 5 have a same construction. Therefore, only one of the injection devices 2 and its related lower mold 5 will be described with reference to FIG. 2, which shows a vertical sectional view of the lower mold 5 and the injection nozzle 3 and the injection cylinder 4 of the injection device 2.

The injection nozzle 3 generally has a cylindrical tubular shape and includes a base end portion 31 on the side of the injection cylinder 4, a front end portion 32 on the side of the lower mold 5, and a body portion 33 positioned between the base end portion 31 and the front end portion 32. A flange 311 is formed on the outer surface of the base end portion 31 and protrudes radially outwardly therefrom. The flange 31 is configured to have a predetermined thickness and a predetermined outer diameter. A male thread 321 is formed on the outer surface of the front end portion 31 for fixedly mounting the lower mold 5 to the front end portion 31. A cylindrical tubular heater 34 may be fitted on the outer surface of the body portion 33 for melting the resin material with heat. An outlet 35 is formed in the front end so as to be opened in an axial direction toward the lower mold 5, so that the molten resin can be injected from the outlet 35 into a space C1 defined in the lower mold 5 via a needle insertion hole 52 and a gate 53 that will be explained later. The space C1 serves to define a part of the cavity as will be hereinafter explained and has an upper side. A torpedo 36 having a needle valve 37 is mounted within a resin flow passage formed in the injection nozzle 3. The torpedo 36 is configured to allow passage the resin material on its radially outer side for controlling the flow of the resin material and for facilitating the plasticization of the resin material. The needle valve 37 is biased in a direction toward the outlet 35 by a spring (not shown) disposed within the torpedo 36.

The injection cylinder 4 includes a cylinder body 40 and a flange holder plate 41 that serves to hold the flange 311 of the injection nozzle 3 against the cylinder body 40. The cylinder body 40 has an annular nozzle fitting portion 401 that is configured as an annular recess formed by enlarging an upper end portion of a resin flow passage defined in the cylinder body 40, so that a part of the lower end portion 31 of the injection nozzle 3 positioned on the lower side of the flange 311 can be fitted into the nozzle fitting portion 401. A nozzle insertion hole 411 is formed in the flange holder plate 41 to extend therethrough. The lower end portion 31 of the injection nozzle 3 is inserted into the nozzle insertion hole 411. A flange fitting portion 412 is configured as an annular recess formed by enlarging the lower end portion of the nozzle insertion hole 411, and the flange 311 is fitted into the flange fitting portion 412. The flange holder plate 41 is fixedly mounted to the top surface of the cylinder body 40 by means of bolts 100, so that the flange 311 is held between the flange holder plate 41 and the cylinder body 40. The nozzle fitting portion 401, the nozzle insertion hole 411 and the flange fitting portion 412 are coaxial with the injection nozzle 3 and its flange 311. In this example, the lower end portion 31 of the injection nozzle 3 is rotatably fitted into the nozzle fitting portion 401, the lower end portion 31 of the injection nozzle 3 is rotatably inserted into the nozzle insertion hole 411, and the flange 311 is rotatably fitted into the flange fitting portion 412. Therefore, the injection nozzle 3 can rotate relative to the cylinder body 40 about the axis.

The lower mold 5 has a female thread portion 51 that is engaged with the male thread portion 321 of the injection nozzle 3. The female thread portion 51 is formed on an inner circumferential wall of an insertion hole formed in the lower mold 5 for receiving the upper end portion 32 of the injection nozzle 3. Therefore, the lower mold 5 is mounted to the injection nozzle 3 through engagement between the male thread portion 321 and the female thread portion 51. The lower mold 5 is formed with the needle insertion hole 52 and the gate 53. In the mounted state of the lower mold 5 to the injection nozzle 3, the needle insertion hole 52 communicates with the outlet 35 of the injection nozzle 3. The gate 53 communicates between the needle insertion hole 52 and the space C1. The nozzle insertion hole 52 is configured as a conical surface tapered toward the gate 53. In this way, in the mounted state, the injection nozzle 3 and the lower mold 5 define a flow passage of the molten resin from inside of the injection nozzle 3 into the space C1. The gate 53 is normally closed by the needle valve 37. When a pressure of the molten resin supplied into the injection nozzle 3 exceeds a predetermined pressure, the needle valve 36 is forced to move downward away from the gate 53 by the pressure of the molten resin, so that the gate 53 is opened to allow injection of molten resin into the space C1. A water passage 54 is formed in the lower mold 5 at a position proximal to its outer circumference for cooling the molten resin injected into the space C1.

A process for assembling the injection cylinder 4, the injection nozzle 3, the heater 34 and the lower mold 5 to each other will now be described with reference to FIG. 3. First, the base end portion 31 of the injection nozzle 3 is fitted into the nozzle fitting portion 401 of the cylinder body 40. Next, the flange holder plate 41 is slidably fitted on the of the body portion 33 of the injection nozzle 3 such that the body portion 33 is inserted into the nozzle insertion hole 411 of the flange holder plate 41 until the flange fitting portion 412 of the flange holder plate 41 is fitted with the flange 311 of the injection nozzle 3 (until the flange holder plate 41 contacts the upper end surface of the cylinder body 40). Then, the flange holder plate 41 is fixed to the upper end surface of the cylinder body 40 by using the bolts 100. Subsequently, the heater 34 is fitted on the body portion 33 of the injection nozzle 3. Finally, the female thread portion 51 of the lower mold 5 is engaged with the male thread portion 321 formed on the front end portion 32 of the injection nozzle 3, so that the lower mold 5 is directly mounted to the injection nozzle 3.

Because the lower mold 5 is directly mounted to the injection nozzle 3 through engagement between the female thread portion 51 and the male thread portion 321, the orientation of the lower mold 5 may change depending on the engaging depth or the tightening force applied to the lower mold 5. In other words, the rotational position of the lower mold 5 relative to the cylinder body 40 may not be always the same after the mounting operation. However, in this example, the orientation or the rotational position of the lower mold 5 can be set to a desired orientation or a desired rotational position by rotating the injection nozzle 3 relative to the cylinder body 40.

In order to mold resin products by using the molding machine 1 described above, the base member B is placed on the lower molds 5 such that the upper opening of the spaces C1 are closed by the base member B as shown in FIG. 1 and the spaces C1 communicate with through-holes B1 formed in the base member B. Then, the mold clamping device 15 is operated to move the movable-side mount base 14 downward toward the base member B until the lower ends of the upper molds 16 contact the upper surface of the base member B. A space C2 is formed in the lower end of each of the upper molds 16 for defining a part of the cavity. When the lower ends of the upper molds 16 contact the upper surface of the base member B, the spaces C2 of the upper molds 16 communicate with the through-holes B1 of the base member B. Therefore, the spaces C1 of the lower molds 5 communicate with the spaces C2 of the corresponding upper molds 16 through the through-holes B1 formed in the base member B, while the base member B is clamped between the lower molds 5 and the upper molds 16. Thereafter, the molten resin is injected into the spaces C1 from the corresponding injection nozzles 3. The molten resin flows from the spaces C1 into the spaces C2 of the corresponding upper molds 16 through the through-holes B1 of the base member B, so that the molten resin is filled within cavities each defined by the space C1, the space C2 and the through-hole B1 connecting between the spaces C1 and C2. As a result, a plurality of resin products having configurations conforming to the cavities can be molded on the base member B after solidification of the molten resin.

According the example described above, each of the lower molds 5 is directly connected to the corresponding injection device 2. Therefore, each of the lower molds 5 can be moved together with the injection device 2 to change the molding position with respect to the base member B. As a result, it is possible to easily change the molding position.

Further, as the mold clamp device 15 is operated to move the upper molds 5 toward the lower molds 16 until the base member B is held between the upper molds 16 and the lower molds 5, the cavities for molding the resin products can be formed. Therefore, the molding operation can be efficiently performed.

Further, according to the above example, each of the lower molds 5 is connected to the corresponding injection nozzle 3 through the thread engagement, and the injection nozzle 3 can rotate relative to the device body 20 of the injection device 2 about the axis. Therefore, even in the case that the orientation of the lower mold 5 has been offset from a desired orientation as a result of mounting to the injection nozzle 3, the orientation of the lower mold 5 can be changed to the desired orientation by rotating the injection nozzle 3 together with the lower mold 5.

The above example may be modified in various ways. For example, although the injection devices 2 are mounted to the fixed-side mount base 11, the fixed-side mount base 11 may be replaced with a movable mount base moved by the mold clamping device 15, an the movable-side mount base 14 may be replaced with a fixed mount base. Alternatively, the injection devices 2 may be mounted to the movable side mount base 14 and the upper molds 16 may be mounted to the injection devices 2. In such a case, the lower molds 5 may be directly mounted to the fixed-side mount base 11.

Figure 4:
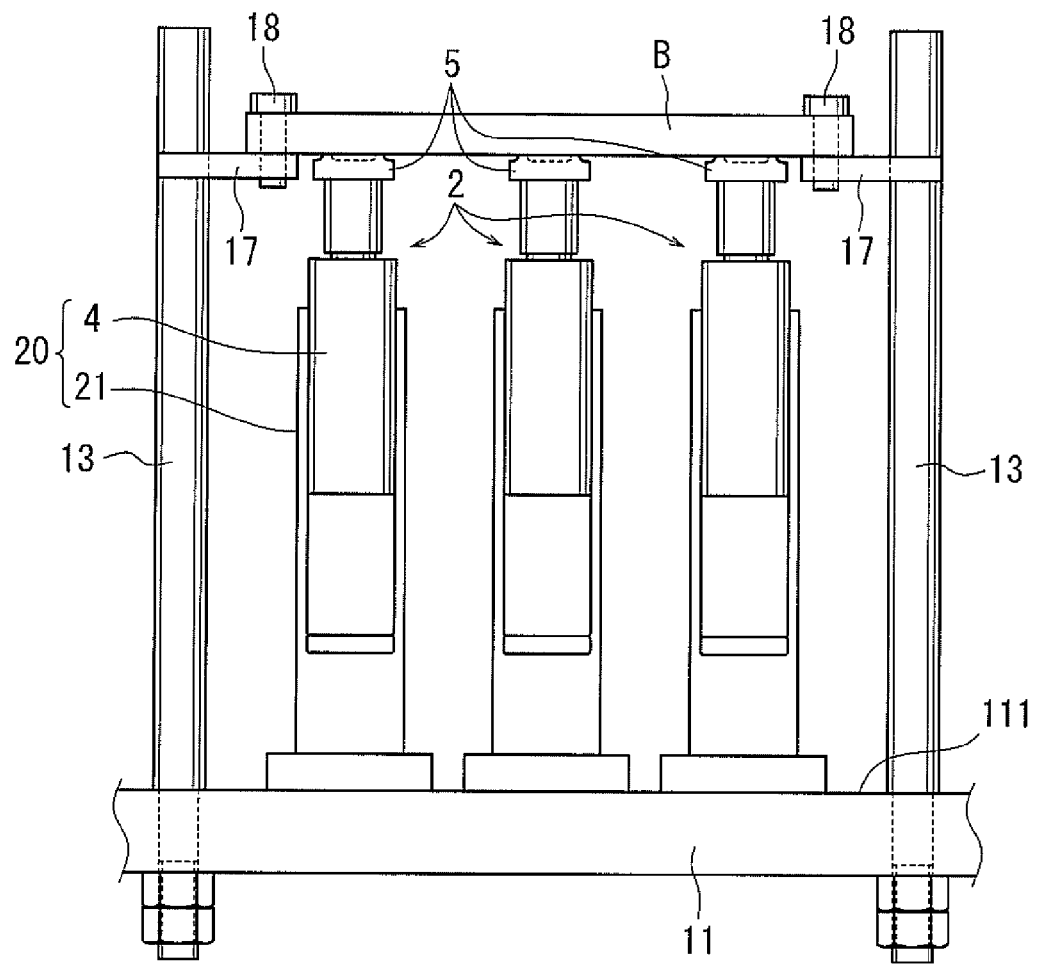
FIG. 4 is a front view of a molding machine according to another example.
Figure 5:
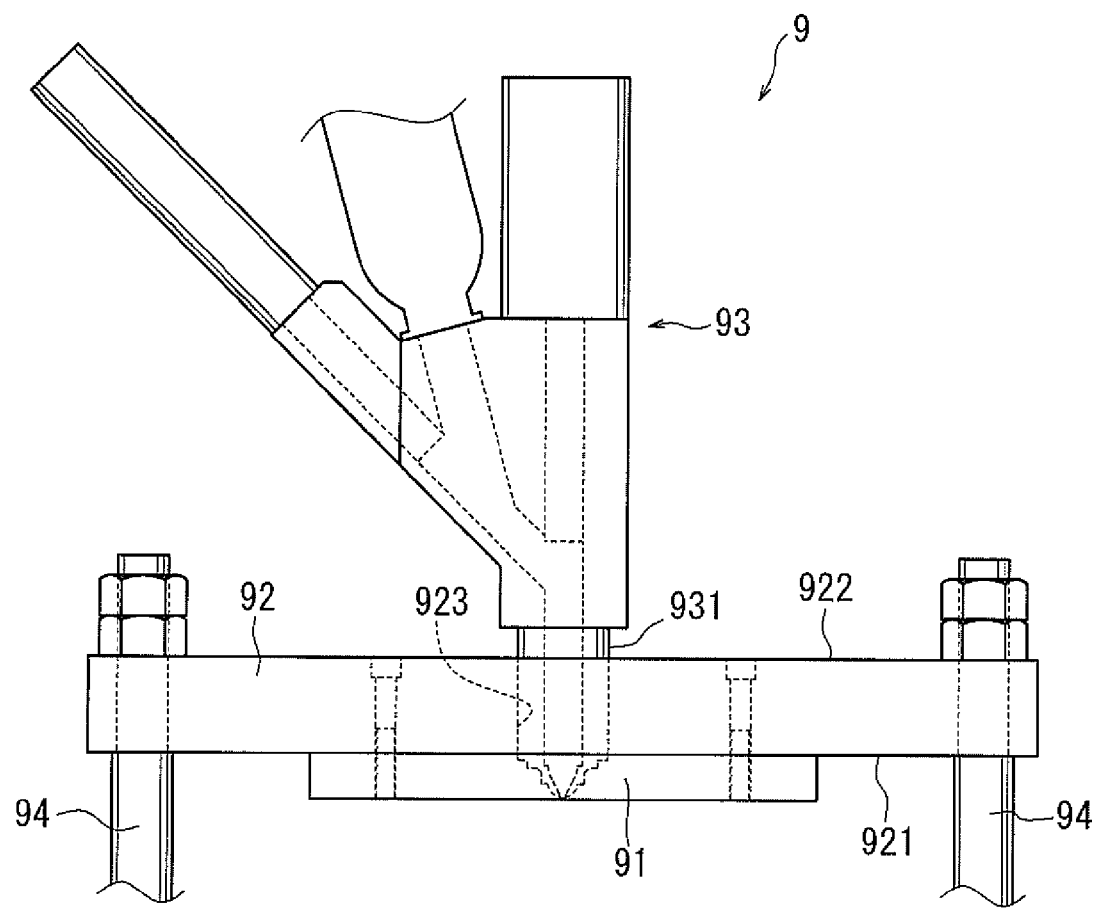
FIG. 5 is a schematic view of a part of a known direct molding machine.

Further, although each of the cavities are defined by the space C1 of the lower mold 5, the space C2 of the upper mold 16 and the through-hole B1 formed in the base member B when the base member B is held between the upper molds 16 and the lower molds 5, the cavities may be formed only by the spaces C1 of the lower molds 5. Thus, the upper molds 16 may be configured not to have the spaces C2 and the base member B may be configured not to have through-holes B1. In such a case, the upper molds 16 may be replaced with holding members that simply apply pressing forces to the base member B from the upper side. Additionally, in this case, the mold clamping device 15, the movable-side mount base 14 and the holding members may be replaced with any other holding mechanism as long as such a holding mechanism can hold the base member B in contact with the lower molds 5 for defining cavities. For example, as shown in FIG. 4, brackets 17 may be mounted to the tie bars 13 and may be connected to opposite ends of the base member B by bolts 18. Alternatively, an operator may hold the base member B against the lower molds 16 with his or her hands.

Furthermore, although the molding machine 1 of the above example is configured as a vertical type molding machine having upper molds 16 and lower molds 5, the above teachings can also be applied to a horizontal type molding machine having a left side mold(s) and a right side mold(s) that are opposed to each other in a horizontal direction. It is also possible to mold products without intervention of the base member B between the upper and lower molds. Further, the number of pairs of the upper mold and the lower mold may not be limited to three but may be one, two or four or more. Furthermore, the base member B may be made of resin or any other material such as metal.

What is claimed is:

1. A molding machine comprising:
   a vertically oriented longitudinal axis;
   lower mount base having a mount surface;
   a lower mold having a contact surface configured to contact a lower surface of a previously molded base member, wherein the molding machine is configured to axially compress the contact surface of the lower mold and the lower surface of the base member together with respect to the longitudinal axis; and
   a first injection device including:
      a lower end and an upper end opposite the lower end, the lower end being mounted to the mount surface of the first mount base;
      a tubular injection nozzle disposed at the upper end of the first injection device;
      a valve movably mounted within the injection nozzle;
      wherein the lower mold is mounted to the tubular infection nozzle;
      wherein the first mold is configured such that at least a part of a cavity is defined by the lower mold and the lower surface of the base member when the lower mold contacts the lower surface of the base member;
      wherein the valve is movable within the injection nozzle between a first position where fluid communication between the injection nozzle and the cavity is restricted by the valve and a second position where fluid communication between the injection nozzle and the cavity is established;
      wherein the valve is configured to transition from the first position to the second position as a result of a pressure of a molten resin within the injection nozzle rising above a predetermined value; and
      wherein the tubular injection nozzle of the first injection device is configured to inject a molten resin vertically upward into the cavity when the valve is in the second position, so that a resin product molded by the resin injected into the cavity is fixed to the base member.

2. The molding machine as in claim 1, further comprising:
   an upper mount base having a mount surface positioned to be opposed to the mount surface of the lower mount base;
   an upper mold; and
   a mold clamping device, wherein:
      the mold clamping device is configured to move at least one of the lower mold and the upper mold along the longitudinal axis, so that the lower mold and the upper mold can axially move toward each other to contact the base member; and
   the cavity is defined by the lower mold, opposite surfaces of the base member and the upper mold.

3. The molding machine as in claim 2, wherein:
   the first injection device includes a device body;
   the device body is disposed at the lower end of the first injection device;
   the lower mold is threadably mounted to the injection nozzle; and
      wherein the device body includes a base end portion that engages the injection nozzle such that the injection nozzle is rotatable relative to the device body about an axis of the injection nozzle that is parallel to the longitudinal axis.

4. The molding machine as in claim 1, wherein:
   the first injection device includes a device body;
   the device body is disposed at the lower end of the first injection device;
   lower mold is threadably mounted to the injection nozzle; and
      wherein the device body includes a base end portion that engages the injection nozzle such that the injection nozzle is rotatable relative to the device body about an axis of the injection nozzle that is parallel to the longitudinal axis.

5. The molding machine as in claim 1, further comprising:
   a second injection device including a lower end and a upper end opposite the lower end, the lower end of the second injection device being mounted to the mount surface of the first mount base; and
   a third mold mounted to the upper end of the second injection device.

6. A molding machine comprising:
   a lower mount base;
   an upper mount base vertically spaced from the lower mount base;
   an injection device vertically disposed between the lower mount base and the upper mount base and configured to inject molten resin, the injection device including:
      a lower end and an upper end, wherein the lower end of the injection device is engaged with the lower mount base; and
      a tubular injection nozzle disposed at the upper end of the injection device the tubular injection nozzle including body portion having an inner diameter;
   a mold vertically disposed between the injection device and the upper mount base, wherein the mold is directly and removably mounted to the tubular infection nozzle, and wherein the mold has a gate having a diameter that is smaller than the inner diameter of the body portion; and
   a mold clamping device configured to compress the mold and the injection device vertically between the upper mount base and the lower mount base;
      wherein the mold defines a cavity for receiving the molten resin;

wherein the tubular injection nozzle further includes a valve configured to:
    restrict fluid communication between the cavity and the body portion through the gate when the valve is in a closed position; and
    allow fluid communication between the cavity and the body portion when the valve is in an open position; and
wherein the injection device is configured to inject the molten resin vertically upward from the body portion, through the gate, and into the cavity when the valve is in the open position.

7. The molding machine as in claim 6, wherein:
the injection device has a first thread;
the mold has a second thread engaging with the first thread.

8. The molding machine as in claim 7, wherein:
the first thread is a male thread and the second thread is a female thread.

9. The molding machine as in claim 8, wherein:
the mold has a nozzle insertion hole for receiving an upper end portion of the injection nozzle;
the male thread is formed on an outer surface of the upper end portion of the injection nozzle; and
the female thread is formed with an inner wall of the nozzle insertion hole.

10. The molding machine as in claim 9, wherein:
the injection device further includes a device body rotatably supporting the injection nozzle about vertically oriented axis of the injection nozzle.

11. A molding machine configured to mold a resin product on a base member, the base member having a through-hole, the molding machine comprising:
    a first injection device configured to a inject molten resin, the first injection device including:
        a lower end and an upper end opposite the lower end;
        a tubular infection nozzle disposed at the upper end of the first injection device;
        valve movably mounted within the injection nozzle;
    a lower mold directly and removably mounted to the upper end of the first injection device and defining a first space for receiving the molten resin injected by the first injection device;
    an upper mold defining a second space;
    a lower mount base supporting the first mold, wherein the lower end of the first injection device is mounted to the lower mount base;
    an upper mount base supporting the upper mold; and
    a mold clamping device coupled to at least one of the upper mold and the lower mold and configured to vertically compress the base member between the lower mold and the upper mold such that the through-hole establishes fluid communication between the first space and the second space;
    wherein the valve is movable within the injection nozzle between an open position where fluid communication between the injection nozzle and the first space is restricted, and a closed position where fluid communication between the injection nozzle and the first space is established;
    wherein the valve is configured to transition from the first position to the second position as a result of a pressure of the molten resin within the injection nozzle rising above a predetermined value; and
    wherein the first injection device is configured to inject the molten resin vertically upward from the injection nozzle into the first space, the through-hole of the base member, and the second space when the valve is in the open position to form a resin product integrated with the base member.

12. The molding machine as in claim 11, further comprising:
    a second injection device configured to inject molten resin, the second injection device including a lower end and an upper end opposite the lower end; and
    a third mold directly and removably connected to the upper end of the second injection device and defining a third space for receiving the molten resin injected by the second injection device.

* * * * *